US 6,695,005 B2

(12) United States Patent
Ottestad

(10) Patent No.: US 6,695,005 B2
(45) Date of Patent: Feb. 24, 2004

(54) PRESSURE REGULATING VALVE

(75) Inventor: Nils Terje Ottestad, Tønsberg (NO)

(73) Assignee: Ottestad Breathing Systems AS, Husoysund (NO)

( * ) Notice: Subject to any disclaimer, the term of this patent is extended or adjusted under 35 U.S.C. 154(b) by 0 days.

(21) Appl. No.: 10/169,438

(22) PCT Filed: Jan. 5, 2001

(86) PCT No.: PCT/NO01/00005
§ 371 (c)(1),
(2), (4) Date: Sep. 10, 2002

(87) PCT Pub. No.: WO01/50052
PCT Pub. Date: Jul. 12, 2001

(65) Prior Publication Data
US 2003/0052200 A1 Mar. 20, 2003

(30) Foreign Application Priority Data
Jan. 6, 2000 (NO) ............................................... 000058

(51) Int. Cl.⁷ ............................................... F16K 31/36
(52) U.S. Cl. ....................................... 137/488; 137/510
(58) Field of Search ................. 137/488, 490, 137/494, 505.13, 505.42, 510

(56) References Cited

U.S. PATENT DOCUMENTS

| | | | | |
|---|---|---|---|---|
| 2,701,578 A | * | 2/1955 | Hamilton | 137/116.5 |
| 2,941,543 A | * | 6/1960 | Kleczek | 137/505.18 |
| 3,690,616 A | | 9/1972 | Lewis et al. | |
| 3,762,436 A | * | 10/1973 | Clayton | 137/505.35 |
| 3,857,407 A | * | 12/1974 | Olson | 137/495 |
| 4,534,380 A | | 8/1985 | Ottestad | |
| 5,490,539 A | | 2/1996 | Ottestad | |
| 5,542,417 A | | 8/1996 | Ottestad | |

* cited by examiner

Primary Examiner—John Rivell
Assistant Examiner—Ramesh Krishnamurthy
(74) Attorney, Agent, or Firm—Frommer Lawrence & Haug LLP; Ronald R. Santucci

(57) ABSTRACT

A pressure regulating valve for controlling an upstream fluid pressure in relation to a reference pressure by regulating the fluid quantity let through the valve, comprising a housing (1) having an upstream inlet (2) and a downstream outlet (3) for the fluid, a pressure-sensitive element (5) for sensing the pressure difference between the upstream pressure and the reference pressure, and a spring-loaded regulating piston (7) which, in cooperation with a seat (8), is arranged to regulate a flow passage (9) between the inlet (2) and the outlet (3), the piston (7) being operatively connected to the pressure-sensitive element (5), to change its position relative to the seat (8) in accordance with the position of the pressure-sensitive element (5). The regulating piston (7) is slidably arranged on the outside of a guide sleeve (10) having openings (11) for the flow of fluid from the flow passage (9) to the outlet (3). Further, the valve comprises a chamber (15) defined between an end surface (13) of the guide sleeve (10) and an inner end surface (14) of the piston (7), and a pilot body (16) which is mechanically coupled to the pressure-sensitive element (5) and is arranged to open ducts (20–23) for supply of fluid from the inlet (2) to the chamber (15) or delivery of fluid from the chamber (15) to the outlet (3) dependent on the position of the pilot body (16) relative to the regulating piston (7), so that the piston changes its position dependent on the chamber volume and thereby in accurate correspondence with the position of the pressure-sensitive element (5).

6 Claims, 4 Drawing Sheets

PRESSURE REGULATING VALVE

This application is a 371 of International Patent Application No. PCT/NO01/00005 filed Jan. 15, 2001, now WO 01/50052 A1 published Jul. 12, 2001, and claims priority benefits of Norwegian Patent Application No. 2000 0058 filed Jan. 6, 2000.

BACKGROUND

The invention relates to a pressure regulating valve for controlling an upstream fluid pressure in relation to a reference pressure by regulating the fluid quantity let through the valve, comprising a housing having an upstream inlet and a downstream outlet for the fluid, a pressure-sensitive element for sensing the pressure difference between the upstream pressure and the reference pressure, and a spring-loaded regulating piston which, in cooperation with a seat, is arranged to regulate a flow passage between the inlet and the outlet, the piston being operatively connected to the pressure-sensitive element, to change its position in relation to the seat in accordance with the position of the pressure-sensitive element.

The regulating valve according to the invention has been developed in order to be able to maintain a defied pressure difference between an upstream fluid and another fluid having an unstable pressure. It is especially developed for the purpose of being able to maintain an accurate pressure difference between two fluids flowing in separate courses in gas-diffusing diaphragms, such diaphragms being very expensive and not able to tolerate that said pressure difference exceeds given values. Considered generally, the invention is applicable in most situations where it is important to maintain an accurate pressure difference between fluids, or keep a constant pressure of a fluid relative to a given reference pressure.

A relevant field of use for the pressure regulating valve according to the invention is to control the pressure difference across gas-diffusing diaphragms used for removing $CO_2$ from natural gas. For the sake of simplicity, the following description takes its starting point in such an application. It is here natural to let the natural gas represent the reference pressure, the fluid controlled by the pressure regulating valve preferably being a liquid (for example amine) having a great ability of absorbing $CO_2$.

For achieving an optimum diffusion speed, one has to adapt the dimensions of the gas-diffusing diaphragm to the flow velocity of the natural gas and the $CO_2$ absorbing liquid, respectively. The flow velocity of the liquid preferably is controlled by a pump, care being taken, by means of a pressure regulating valve according to the invention, that the liquid, when passing through the gas-diffusing diaphragm, has a desired pressure relative to the natural gas. Preferably, this is done by arranging a throttling on the liquid line upstream of the gas-diffusing diaphragm, and by arranging a pressure regulating valve according to the invention downstream of this diaphragm, to control the flow resistance so that the liquid pressure at any time has a desired value.

Generally, it will be natural to see to it that a desired liquid pressure is established in the region between a pressure regulating valve and a throttling, the regulator controlling the through-flow of the fluid so that a desired pressure level is achieved in this region. In principle, one may choose to arrange a pressure regulating valve upstream of said throttling. In that case the pressure regulating valve must he arranged to regulate the downstream pressure to a desired value.

The pressure of the natural gas typically may have a magnitude of 70–100 bar. Gas-diffusing diaphragms can stand a high total pressure, but might be damaged if the pressure difference between the natural gas and the amine exceeds e.g. 0,7 bar. In order to optimize diffusion, it is desirable that a certain pressure difference between the two fluids is established. Consequently, it is very important that such a pressure regulating in valve functions optimally.

In the market there exist many types of regulators which are constructed to carry out corresponding regulating functions. The general designation of these regulators is back pressure regulators. However, none of the regulators of which one knows, have been able to exhibit the desired properties with respect to giving a stable and smooth pressure regulation, at the same time as they manage to correct sufficiently rapidly on deviations, so that one avoids pressure pulses which might damage the expensive gas-diffusing diaphragms.

The regulating function of a pressure regulator will always to a certain extent be influenced by pressure and flow variations, since such variations change the force that must be generated to correct for deviations.

On this background the object of the invention is to provide a pressure regulating valve which is without the above-mentioned drawbacks, the valve giving a stable and smooth pressure regulation at the same time as it manages to correct sufficiently rapidly on deviations, so that harmful pressure pulses are avoided, and wherein pressure and flow variations have a particularly small influence on the regulating function.

SUMMARY OF THE INVENTION

For achieving the above-mentioned object there is provided a pressure regulating valve of the introductorily stated type which, according to the invention, is characterized in that the regulating piston is slidably arranged on the outside of a guide sleeve having openings for flow of liquid from the flow passage to the outlet, and that the valve comprises a chamber defined between an end surface of the guide sleeve and an inner end surface of the piston, and a pilot body which is mechanically coupled to the pressure-sensitive element and is arranged to open ducts for supply of fluid from the inlet to the chamber or delivery of fluid from the chamber to the outlet dependent on the position of the pilot body relative to the regulating piston, so that the piston changes its position dependent on the chamber volume and thereby in accurate correspondence with the position of the pressure-sensitive element.

BRIEF DESCRIPTION OF THE DRAWINGS

Advantageous embodiments of the invention are stated in the dependent claims.

The invention will be further described below in connection with exemplary embodiments with reference to the drawings, wherein.

DETAILED DESCRIPTION

Figure 1:
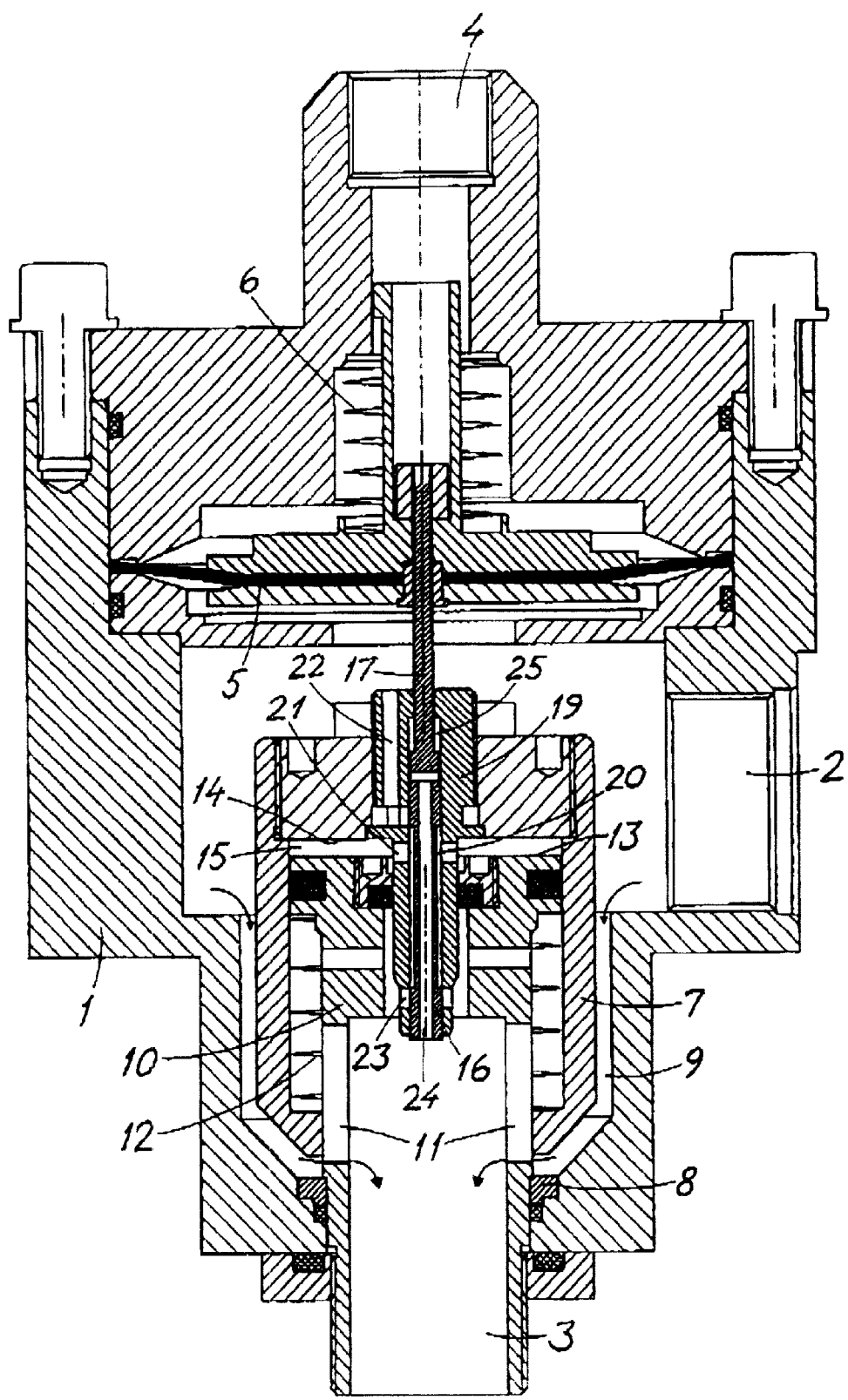
FIG. 1 shows a longitudinal sectional view of a preferred embodiment of the regulating valve according to the invention.

In the embodiment shown in FIG. 1 the regulating valve is shown in partly open to position. The regulating unit is built into a housing 1 having an upstream inlet 2 and a downstream outlet 3 for the fluid which is to flow through the valve. Further, the housing has an additional inlet 4 for the relevant gas, e.g. natural gas, as mentioned in the introduction. The pressure of this gas represents the reference value of the valve.

As appears from FIG. 1, a pressure-sensitive element is arranged in housing 1, which element in the shown embodiment is in the form of a peripherally fixed diaphragm 5, for sensing of the pressure difference between the upstream pressure, i.e. the fluid pressure in the inlet 2, and the reference pressure. As appears, the underside of the diaphragm 5 is influenced by the fluid pressure, whereas the upper side of the diaphragm is influenced by the reference pressure and the force from a preloading spring 6, so that the magnitude of the preloading force of the spring determines the pressure level of the fluid in relation to the natural gas.

In the housing 1 there is further arranged a spring-loaded regulation piston 7 which, in cooperation with a seat 8, is arranged to regulate a flow passage 9 between the inlet 2 and the outlet 3, the piston 7 being operatively connected to the sensor diaphragm 5, as further described below. As shown, the regulating piston 7 is shaped as an essentially cup-shaped body which is slidably arranged on the outside of the upper end portion of a guide sleeve 10 which is fixed in the housing 1. The guide sleeve is provided with openings 11 for the flow of fluid from the annular flow passage 9 to the outlet 3 when the piston 7 is raised from the seat 8. The openings 11 are constituted by symmetrically arranged ports in the sleeve wall directing fluid from the flow passage 9 radially inwards towards the center of the outlet 3. The fluid flow is illustrated by arrows in FIG. 1.

In an annulus between the piston 7 and the guide sleeve 10 there is placed a spring 12 which provides for said spring loading of the piston, and which at any time seeks to press the piston downwards against the seat 8.

Between an upper end surface 13 of the guide sleeve 10 and a lower or inner end surface 14 of the piston 7 there is provided a chamber 15 which is arranged to be supplied with fluid from the inlet 2 and to deliver fluid to the outlet 3 in dependence on the positions of a pilot body 16 which is mechanically coupled to the sensor diaphragm 5. The pilot body 16 consists of an elongated cylindrical element which is connected to the diaphragm 5 via an operating rod 17, and which is slidably arranged in an axially extending bore 18 (see FIG. 2A) in a guide body 19 in the regulating piston 7. The pilot body 16 and its guide body 19 are carried centrally through said end surfaces 13 and 14 of the guide sleeve 10 and the piston 7, respectively.

As shown, between a surface portion of the pilot body 16 and a corresponding portion of the bore 18 of the guide body 19, there is arranged an annular duct or passage 20 communicating with the chamber 15 via a transverse duct 21 in the guide body 19. Further, the guide body 19 is provided with a longitudinal duct 22 in its upper part and is provided with a transverse duct 23 at its lower end, where these ducts are arranged to be communicated with the longitudinal passage 20 in dependence on the position of the pilot body 16 relative to the piston 7.

In the pilot body 16 there is arranged an axially and centrally extending pressure-equalizing duct 24 which, at its lower end, communicates with the valve outlet 3 and at is its upper end communicates with a chamber 25 arranged in the guide body 19 and forming an annulus around the operating rod 17 behind the pilot body 16. This duct sees that the chamber 25 has approximately the same pressure as the outlet 3, so that the downstream pressure also influences the part of the end surface of the pilot body facing the chamber 25. The pressure difference between the upstream and downstream pressure therefore in the reality will only influence the pilot body on an area which is equal to the cross-sectional area of the operating rod 17. Consequently, the pilot body is effectively pressure-balanced.

A further description of the operation of the regulating valve will be given below.

The fluid flow into and out of the chamber 15 at any time is controlled by the position of the regulating piston 7 relative to the pilot body 16 which will turn has its position determined by the position of the sensor diaphragm 5. The position of the sensor diaphragm is in turn determined by the upstream pressure of the fluid in the housing 1 in relation to the tension force of the spring 6 and the pressure of the natural gas which is in open connection with the inlet 4. If the pressure within the housing exceeds a desired value, the sensor diaphragm will immediately be lifted up and pull with it the pilot body 16, and thereby the piston 7, so that the fluid pressure is corrected by increasing the fluid flow. As mentioned above, the magnitude of the tension force of the spring 6 determines the pressure level of the fluid relative to the natural gas.

The fluid flow through the valve is determined by the position of the piston 7 relative to the seat 8. In order to move the piston relative to the seat, it is required that the volume of the chamber 15 is changed. The piston is pulled away from the seat in that the pilot body 16 is lifted under the influence of the sensor diaphragm 5, so that a path is provided for the supply of fluid to the chamber 15 from the inlet 2 via the duct 22 and further through the passage 20 and the duct 21 (see FIG. 2A). In a corresponding manner the piston 7 is moved back towards the seat 8 when the pilot body 16 is pushed downwards by the sensor diaphragm 5, so that fluid from the chamber 15 is dumped to the valve outlet 3 via the path provided from the chamber via the duct 21, the passage 20 and the duct 23 (see FIG. 2B).

Figure 2A:
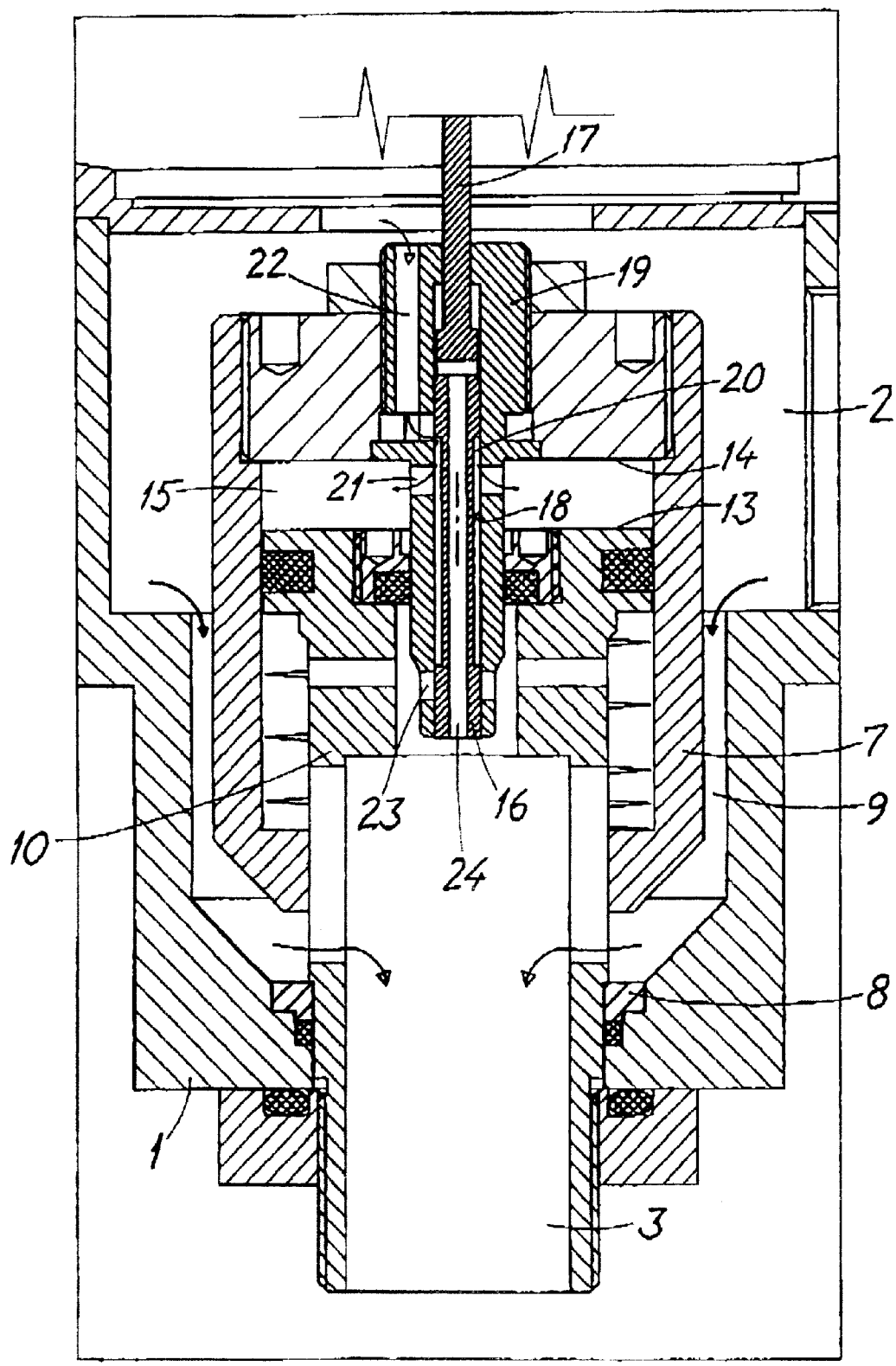
FIGS. 2A and 2B show a segment of the regulating mechanism of the valve of FIG. 1 and shows the function of the pilot body in two different phases of the regulation.
Figure 2B:
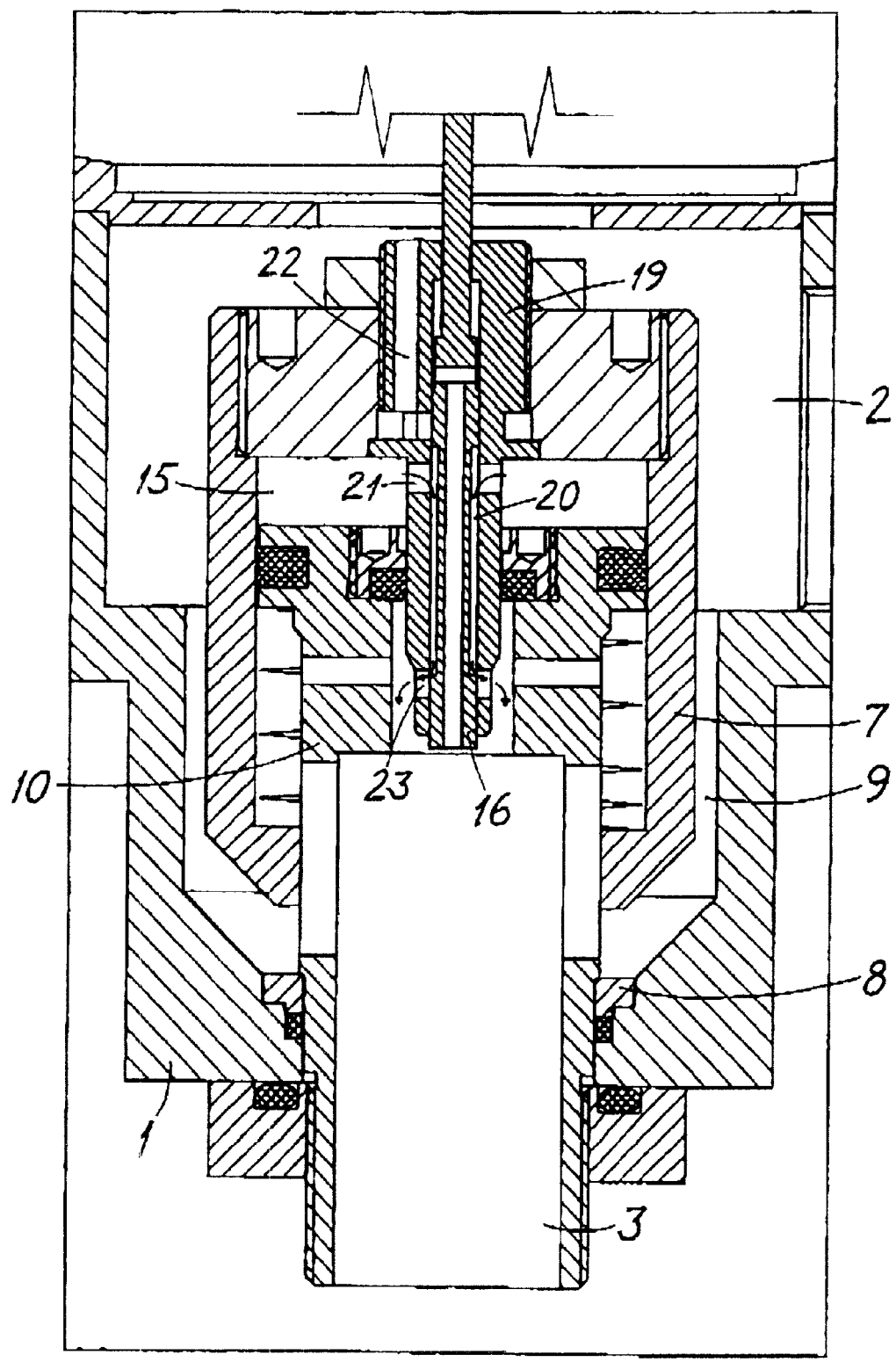

FIG. 2A shows an enlarged segment of the regulating mechanism of FIG. 1 in the situation wherein the pilot body 16 has been lifted up by the sensor diaphragm 5, so that fluid is directed into the chamber 15 with the consequence that the piston 7 immediately follows. FIG. 2B correspondingly shows an enlarged segment of the regulating-mechanism when the pilot body 16 has been pushed downwards so that fluid is dumped from the chamber 15 to the valve outlet 3, with the consequence that the regulating piston 7 moves towards the closed position. The fluid flow around the pilot body 16 is illustrated by arrows. The hydraulic connection between the pilot body 16 and the piston 7 is very strong. As soon as the pilot body is moved in one direction, the piston will immediately follow. In a normal operating situation for the pressure regulator, the sensor diaphragm, and thereby the pilot body and the regulating piston, will find a position of equilibrium implying that the fluid quantity in the chamber 15 is approximately stable, there being a small permanent fluid flow in the small clearance between the pilot body 16 and the bore 18 in the guide body 19.

Figure 3:
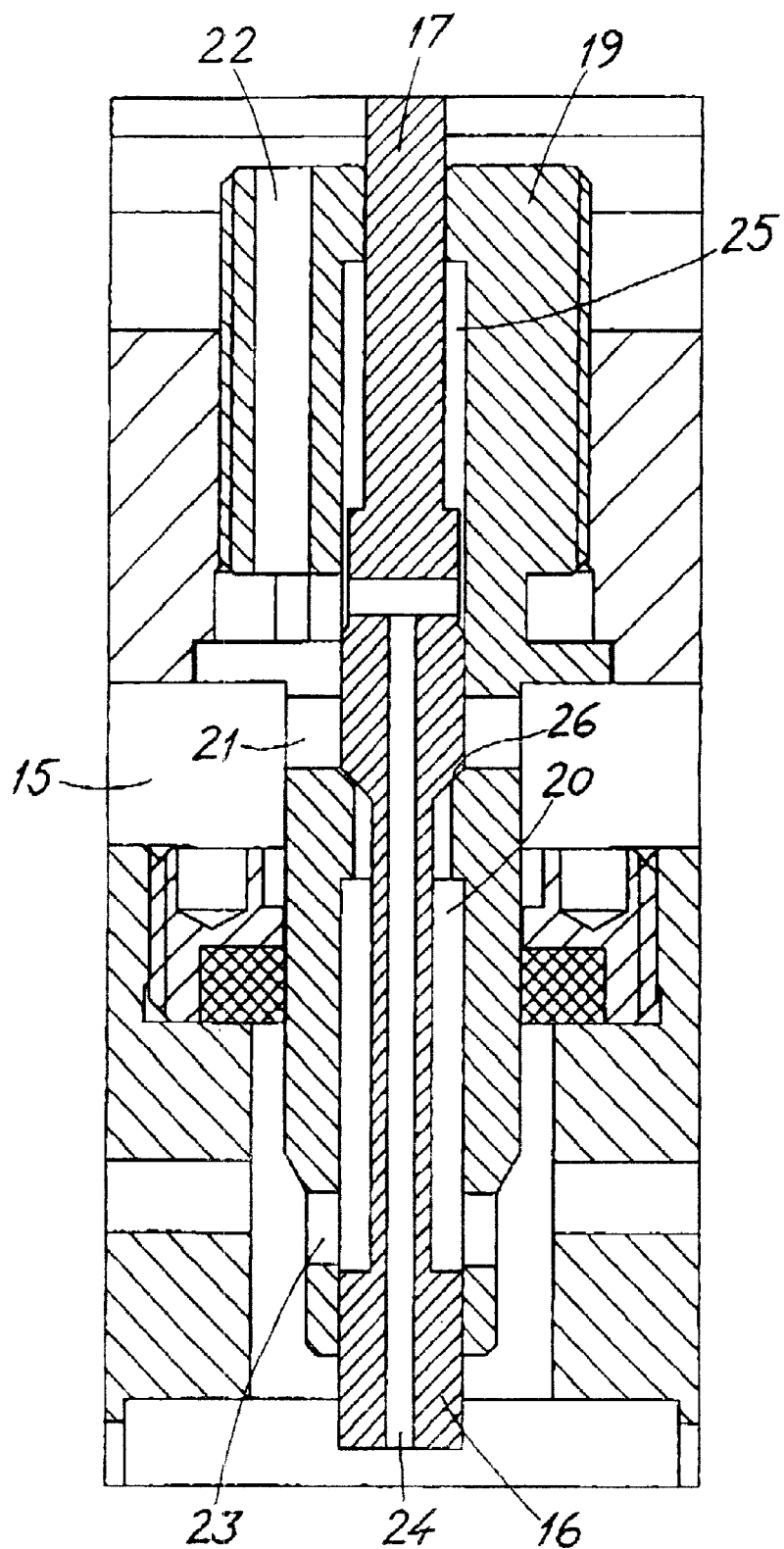
FIG. 3 shows an enlarged segment of a part of the regulating mechanism in an embodiment wherein the pilot body and the guide body thereof are shaped such that the valve is quite leakage free in the closed position.

In the embodiment shown in FIGS. 1 and 2, one has chosen to use a metal-to-metal seal between the regulating piston 7 and the seat 8. The sealing surfaces may be ground so that the sealing connection is approximately gas-tight. Alternatively, the annular seal may be of a soft material. As mentioned above, there is a small clearance in the guide between the pilot body 16 and the bore 18, which implies that there is always a certain fluid flow past the pilot body. It is possible, however, to arrange a metal-to-metal seal, or alternatively a soft seal, causing the fluid flow past the pilot body to be shut off completely when the pressure regulating valve moves towards the closed position. This is necessary for possibly making the pressure regulating valve absolutely leakage-free. An embodiment with such a seal is shown in FIG. 3 wherein the guide body 19 is provided with a seat 26 for sealing against the pilot body 16.

By means of the above-mentioned pressure equalizing duct 24 one achieves that the pilot body 16 is effectively pressure balanced. The pressure regulating valve therefore has the ability to maintain in a stable manner a desired pressure in the fluid flowing through the valve at the underside of the sensor diaphragm 5.

What is claimed is:

1. A pressure regulating valve for controlling an upstream fluid pressure in relation to a reference pressure by regulating the fluid quantity let through the valve, comprising a housing (1) having an upstream inlet (2) and a downstream outlet (3) for the fluid, a pressure-sensitive element (5) for sensing the pressure difference between the upstream pressure and the reference pressure, and a spring-loaded regulating piston (7) which, in cooperation with a seat (8), is arranged to regulate a flow passage (9) between the inlet (2) and the outlet (3), the piston (7) being operatively connected to the pressure-sensitive element (5), wherein the regulating piston (7) is slidably arranged on the outside of a guide sleeve (10) having openings (11) for flow of fluid from the flow passage (9) to the outlet (3), and that the valve comprises a chamber (15) defined between an end surface (13) of the guide sleeve (10) and an inner end surface (14) of the piston (7), and a pilot body (16) which is mechanically coupled to the pressure-sensitive element (5) and is arranged to open ducts (20–23) for supply of fluid from the inlet (2) to the chamber (15) or delivery of fluid from the chamber (15) to the outlet (3) dependent on the position of the pilot body (16) relative to the regulating piston (7), so that the piston changes its position dependent on the chamber volume and thereby in accurate correspondence with the position of the pressure-sensitive element (5).

2. A pressure regulating valve according to claim 1, wherein the openings (11) in the guide sleeve (10) are constituted by symmetrically arranged ports directing fluid from the flow passage (9) radially inwards towards the center of the downstream outlet (3).

3. A pressure regulating valve according to claim 1, wherein the pressure-sensitive element (5) is constituted by a diaphragm of which one side is influenced by the upstream fluid pressure, and of which the other side is influenced by the reference pressure and a preloading spring (6), so that the preloading spring determines the pressure level of the upstream fluid relative to the reference pressure.

4. A pressure regulating valve according to claim 1, wherein the pilot body (16) consists of an elongated, cylindrical element which is connected to the pressure-sensitive element (5) via an operating rod (17), and which is slidably arranged in a guide body (19) in the regulating piston (7), a passage (20) being arranged along a portion of the pilot body (16), which passage communicates with the chamber (15) and with its end portions is arranged to be brought into flow connection with the inlet (2) and the outlet (3), respectively, dependent on the position of the pilot body (16) relative to the regulating piston (7).

5. A pressure regulating valve according to claim 4, wherein the pilot body (16) and the guide body (19) thereof are carried centrally through said end surfaces (14, 13) of the regulating piston (7) and the guide sleeve (10).

6. A pressure regulating valve according to claim 4, wherein the cylindrical element of the pilot body (16) is provided with an axially extending pressure-equalising duct (24) of which one end debouches in the downstream outlet (3) and of which the other end communicates with a chamber (25) in the guide body (19) of the regulating piston (7) behind the pilot body (16), so that the pressure difference between the upstream and downstream pressures of the valve influences the pilot body (16) only on an area equal to the cross-section of the operating rod (17) of the pilot body.

* * * * *